Patented Feb. 15, 1944

2,341,867

UNITED STATES PATENT OFFICE 2,341,867

TREATMENT OF PLANT BUDS

Albert E. Hitchcock and Percy W. Zimmerman, Yonkers, N. Y., assignors to Boyce Thompson Institute for Plant Research, Inc., Yonkers, N. Y., a corporation of New York No Drawing. Application June 23, 1939, Serial No. 280,806

12 Claims. (Cl. 47—58)

This invention relates to the treatment of buds on trees, plants and the like, and has for its object the provision of an improved method of retarding bud development. Throughout the specification and claims the word "bud" is used in its generic botanical sense and includes flower buds, leaf buds, resting buds, etc., of trees, plants, bulbs, tubers, corms, cormels and other forms of stem-producing botanical structures. While the invention is of particular advantage in inhibiting development of flower buds on fruit trees and other woody plants, it may be practiced with advantage wherever, for any reason, it is desirable to inhibit, delay or retard the development or growth of buds.

Flower buds on fruit trees frequently develop to an advanced stage before danger of frost has passed. In localities where frosts may occur during the budding stage, an early spell of warm weather may prematurely develop the buds, and a subsequent frost will kill the open and partially open buds. At other times, late or unseasonable frosts kill or injure the buds. In many regions, a delay of one or two weeks in the development of the flower buds would frequently avoid serious and sometimes disastrous injury to the flower buds, and insure a normal fruit crop.

In working with the root-growth substances of our United States patents, Nos. 2,129,598–2,129,601 in inducing root-growth on plant cuttings, we have observed that immersion of the basal end of the cutting in a solution of the root-growth substance frequently retarded bud growth. We have also observed that if the apical ends of the cuttings were treated with either lanolin or water preparations of the root-growth substances, bud growth was usually inhibited for a period of at least two to three weeks. Subsequently, these observations led to our discovery that the direct application of suitable preparations of the root-growth substances to buds on living plants, bulbs, tubers and the like exercise a marked retarding effect on the development of the buds. Based on this discovery, our present invention, in its broad aspect, involves the treatment of buds with a bud-retarding substance (e. g. naphthaleneacetic acid) in such concentration that the normal development of the bud is substantially retarded without impairing the normal development of the bud following the period of retarded development.

All buds on a stem do not grow. In most cases the tip or terminal bud of a shoot prevents the buds below from growing and this effect is referred to as apical dominance. If the tip of the shoot is cut off, one or more of the lower buds will start to grow. Removal of some or all leaves sometimes starts the growth of buds which normally would not develop. These effects whereby one bud or part of a shoot influences the development of one or more buds is generally referred to as correlative inhibition of the growth of buds. The application of a root-growth or bud-retarding substance to the cut surface of a decapitated shoot acts in much the same way as the terminal bud in inhibiting the growth of lower buds on the shoot. No practical application of these phenomena and observations has however been heretofore made or suggested.

In carrying out the present invention the bud-retarding substance is directly applied to the buds whose development it is desired to retard. The application may be made by incorporating the bud-retarding substance in any conveniently handled preparation, such as a solution or powder, and then spraying the solution or dusting the powder on the buds. Or, the bud-retarding substance may be applied in the form of a vapor. The effectiveness of the treatment depends in a large measure on the concentration of the bud-retarding substance, the stage of development of the bud at the time of treatment and the species or variety of plant. In general, the concentration of the bud-retarding substance in a preparation sprayed or dusted on the buds should be approximately of the order of 0.001 to 0.1%. Too low concentrations of the substance are ineffective and too high concentrations injure subsequent normal development of the bud. The optimum time of treatment is before the bud starts to open. In general, flower and leaf buds should be treated when swollen but before the color of the petals becomes distinctly visible. A single treatment of the buds, in accordance with the invention, will delay development of the buds for one to two weeks. The buds may be given a repeated treatment if necessary to further delay their opening.

Among the bud-retarding substances which we have found of special advantage in the practice of the invention are naphthalene substitution products of compounds having the acetic acid structure as its nucleus, such as napthaleneacetic acid (both alpha and beta), naphthoxyacetic acid and salts and esters thereof. The alkali metal salts (including the ammonium salt) are in general the preferred salts and the lower alcohol esters (such as methyl and ethyl esters) are in general the preferred esters for use in carrying out the invention.

The bud-retarding substance may be dissolved in water and applied to the buds of trees, plants and the like by spraying. Such an aqueous spraying solution may be conveniently prepared by dissolving the bud-retarding substance in an alcoholic solvent, containing about 50% or more of alcohol, and then adding the resulting alcoholic solution to the necessary amount of water for attaining the desired concentration of the substance in the spraying solution. Carriers, such as used for insecticide sprays, may be included in the spraying solution to promote wetting of, adherence to and penetration of the buds or bud tissue. Good results have been obtained by including in the spraying solution about 0.1 to 10% of such a carrier as "Penetrol," "Ultra Wet," etc. "Penetrol" is an oxidized sulphonated petroleum product. Olive oil is also a satisfactory carrier, and from 5 to 10% may advantageously be included in aqueous sprays. In general these carriers may be classified as oily carrier agents.

In a practice of the invention, buds on peach, apple, plum and cherry trees were sprayed with an aqueous solution of naphthaleneacetic acid. Solutions of four different concentrations were used, namely, 10, 32, 100 and 320 milligrams of naphthaleneacetic acid per liter of water. Solutions of similar concentrations but including 1% to 10% of "Penetrol" or 1 to 10% of "Ultra Wet" were also used. Each of these solutions retarded bud development when applied to the buds at the proper stage. The stage of swelling or opening of the buds when sprayed was extremely critical for determining the effectiveness of the treatments. Solutions of the two higher concentrations injured the buds when applied after the buds were starting to open, but these same solutions were relatively ineffective in retarding bud development when applied before the buds had started to swell. The intervening period between the time that the solutions were ineffective and the time that they injured the buds was generally a matter of a few days, depending upon the temperature and the variety of plant. The solutions containing "Penetrol" were more effective than the water solutions, but were more injurious to the buds showing color or that had started to open.

Esters of naphthaleneacetic acid in a 5% solution of ethyl alcohol containing 0.5% of "Penetrol" or "Ultra Wet" have also been effectively used as sprays in practicing the invention.

In other practices of the invention, flower buds of woody plants including fruit trees have been dusted with naphthaleneacetic acid, potassium naphthalene acetate incorporated in powdered talc preparations. The concentration of the bud-retarding substances in these preparations was about 0.2 to 5%, by weight; e. g. 2–50 mg. of the bud-retarding substance per gram of finely divided talc.

The effectiveness of the bud-retarding substances in beneficially retarding bud development appears to result from a certain penetration of the substance into the relatively impervious outer tissue of the bud. The greater the concentration of the substance in the spraying solution or dusting powder the more effective is the treatment. The oily carrier agents promote penetration and their presence in sprays imparts more effective penetrating characteristics thereto.

While the invention is of particular value in preventing the premature opening of flower buds on fruit trees, or the retarding of opening until danger of frost is over, the invention may be advantageously practiced for retarding the opening of flower buds or leaf buds on nursery stock in storage, in transit, after being planted and when transplanted. Or, the invention may be practiced for purposes of plant breeding in which early flowering types may be delayed in developing pollen and stigmas so as to be crossed with later flowering types, or to induce fruit set in unopened buds which in some species or varieties would mean the production of seedless fruits.

Various species of certain plants, etc., do not flower at the same time. Therefore, if bud development in the earlier flowering types is retarded until the flowering stage of the later types, successful crosses can be brought about. Fruit set is preferably inducted by treating the unopened buds with the vapor of an ester of naphthaleneacetic acid, or the like. For example, treatment of the unopened buds of American Holly (*Ilex opaca*) with such a vapor retards opening of the flowers and at the same time induces fruit set; that is the fruit develops without viable seeds.

The invention is further of special advantage in inhibiting or retarding the sprouting of bulbs, tubers, corms, cormels, etc. This may be accomplished by soaking or otherwise appropriately treating the whole bulb, tuber, etc., or appropriately cut pieces thereof, with one of the bud-retarding substances of the invention. For example, the bulbs, tubers, etc., may be sprayed with an appropriate preparation containing the bud-retarding substance and also preferably an oily carrier agent. Or, toothpicks or the like soaked in a solution of the bud-retarding substance may be inserted into the bulb, tuber etc.

However, from a practical standpoint it is preferable to treat the whole and uncut bulb, tuber, etc., with the vapor of one of the bud-retarding substances. The esters, particularly the methyl and ethyl esters, of naphthaleneacetic acid, are suitable for the purpose. Thus, the sprouting of potato tubers is effectively retarded by placing the tubers, as for example storing them, in the presence of the methyl or ethyl ester of naphthaleneacetic acid.

The bulbs, tubers, etc., e. g. potato tubers, may be advantageously treated by spraying the sides of the container in which the bulbs, tubers, etc., are stored with an ester of one of the bud-retarding substances, or by placing paper or similar porous material impregnated with the ester in the container with the bulbs, tubers, etc. An especially effective method of treatment is to wrap the bulbs, tubers, etc., in paper impregnated with the ester, or the bulbs, tubers, etc., may be stored in a bag of paper or the like impregnated or sprayed with the ester. A convenient way to apply the ester to the walls of the container or to paper or similar porous material is in solution in acetone, alcohol or other volatile solvent which subsequently evaporates and leaves the ester behind. The ester need not be in the same container as the bulbs, tubers, etc., but air, or other suitable gas, may be drawn over or through the ester and then over the bulbs, tubers, etc. The same container, bag, paper, etc., may be used for the treatment of further lots of bulbs, tubers, etc., since the esters retain their activity for a long period.

The amount of the bud-retarding substance used in inhibiting or retarding the sprouting of bulbs, tubers, etc., may vary over a comparatively wide range. For example, in treating potatoes as little as 2.5 mg. per six large tubers effectively retards sprouting, but as much as 400 mg. can be used without injury to the tubers. The inhibition or retardation of the sprouting of the buds continues for some time after the exposure to the vapor of the bud-retarding substance is discontinued.

The bud-retarding substance may be applied in vapor form to trees and woody plants by covering the tree or plant with a tent, or otherwise enclosing the tree or plant, and then introducing the vapor into the enclosure. Fruit trees may, for example, be so treated for retarding bud development, or for inducing fruit set and hence parthenocarpic development of the fruit.

In our application Serial No. 459,559, filed September 24, 1942, as a continuation-in-part of this application we claim a method of treating storage organs such as tubers with the vapors of plant hormones.

We claim:

1. The method of retarding the development of buds which comprises treating the buds directly with a substance of the group consisting of naphathalene substitution products of compounds having the acetic acid structure as its nucleus in such concentration that the normal development of the bud is substantially retarded without impairing the normal development of the bud following the period of retarded development.

2. The method of retarding the development of buds which comprises treating the buds directly before starting to open with a bud-retarding substance of the group consisting of naphthaleneacetic acid, salts of naphthaleneacetic acid and esters of naphthaleneacetic acid in such concentration that the normal development of the bud is substantially retarded without impairing the normal development of the bud following the period of retarded development.

3. The method of retarding the development of buds which comprises spraying the buds before starting to open with an aqueous solution containing about 0.001 to 0.1% of a substance of the group consisting of naphthalene substitution products of compounds having the acetic acid structure as its nucleus.

4. The method of retarding the development of buds which comprises spraying the buds before starting to open with an aqueous solution containing from 0.5 to 10% of an oily carrier agent and about 0.001 to 0.1% of a substance of the group consisting of naphthalene substitution products of compounds having the acetic acid structure as its nucleus.

5. The method of retarding the development of buds which comprises dusting the buds before starting to open with a powder containing about 0.001 to 0.1% of a substance of the group consisting of naphthalene substitution products of compounds having the acetic acid structure as its nucleus.

6. The method of retarding the development of buds which comprises treating the buds with the vapor of a compound of the group consisting of a lower alkyl ester of naphthaleneacetic acid and naphthoxyacetic acid.

7. The method of retarding the development of buds according to claim 1 which comprises treating flower buds.

8. In a method for extending the dormant period of trees, normally blossoming and foliating at such a time as to be injured by frost and killing temperatures, the step of applying to the dormant tree a spray comprising a relatively small amount of an aryl acetic acid.

9. In a method for extending the dormant period of plants, normally blossoming and foliating at such a time as to be injured by frost and killing temperatures, the step of applying to the dormant plant a spray comprising a relatively small amount of a compound selected from the class consisting of aryl-lower aliphatic acids and aryloxy-lower aliphatic acids.

10. In a method for extending the dormant period of trees, normally blossoming and foliating at such a time as to be injured by frost and killing temperatures, the step of applying to the dormant tree a spray comprising a relatively small amount of alpha-naphthylacetic acid.

11. In a method for extending the dormant period of trees, normally blossoming and foliating at such a time as to be injured by frost and killing temperatures, the step of applying to the tree a spray comprising alpha-naphylacetic acid at a dilution of between 25 and 100 parts per million, from one to three weeks prior to the normal foliation and blossoming time.

12. In a method for extending the dormant period of trees, normally blossoming and foliating at such a time as to be injured by frost and killing temperatures, the step of applying to the tree a spray comprising an arylacetic acid at a dilution of between 25 and 100 parts per million, from one to three weeks prior to the normal foliation and blossoming time.

ALBERT E. HITCHCOCK.
PERCY W. ZIMMERMAN.